United States Patent [19]

Prete, Jr.

[11] 4,324,023
[45] Apr. 13, 1982

[54] RATCHET BUCKLE HAVING REINFORCING SPREADER BAR INSERT

[75] Inventor: Ernest Prete, Jr., Woodland Hills, Calif.

[73] Assignee: Ancra Corporation, El Segundo, Calif.

[21] Appl. No.: 160,636

[22] Filed: Jun. 18, 1980

[51] Int. Cl.³ .................. B25B 25/00; B65D 67/02
[52] U.S. Cl. .................. 24/68 CD; 242/74; 24/71.2; 24/68 R; 24/68 BT
[58] Field of Search .............. 24/68 R, 68 CD, 68 D, 24/68 BT, 71.2, 68 E; 254/222, 223, 247, 248, 217, 218, 249; 242/74

[56] References Cited

U.S. PATENT DOCUMENTS

| | | | |
|---|---|---|---|
| 1,494,791 | 5/1924 | Lampert | 24/71.2 |
| 3,180,623 | 4/1965 | Huber | 24/71.2 X |
| 3,291,416 | 12/1966 | Gionta | 242/74 X |
| 3,802,641 | 4/1974 | Saito | 242/74 |
| 3,826,473 | 7/1974 | Huber | 24/68 CD X |
| 4,119,281 | 10/1978 | Paitula et al. | 242/74 X |
| 4,185,360 | 1/1980 | Prete, Jr. | 24/68 CD |
| 4,199,182 | 4/1980 | Sunesson | 24/68 CD |

*Primary Examiner*—Roy D. Frazier
*Assistant Examiner*—Peter A. Aschenbrenner
*Attorney, Agent, or Firm*—Edward A. Sokolski

[57] ABSTRACT

A ratchet buckle for tightening and tensioning straps which include a bifurcated frame member with a pair of oppositely positioned parallel arms between which a reel member and ratchet wheels are rotatably mounted. The reel member is formed from a pair of oppositely positioned curved plates. This reel member is reinforced structurally by means of a spreader bar insert member which is placed between the plates and which has a slot formed in the center thereof through which a strap to be tensioned is reeved. The insert member has a pair of similar ridge portions running along the outer surfaces of the portions thereof forming the walls of the slot and a pair of wing portions at each of the opposite ends thereof, these wing portions extending in a direction normal to the longitudinal axis of the slot and being fitted between the edges of the curved plates.

5 Claims, 6 Drawing Figures

U.S. Patent    Apr. 13, 1982    4,324,023
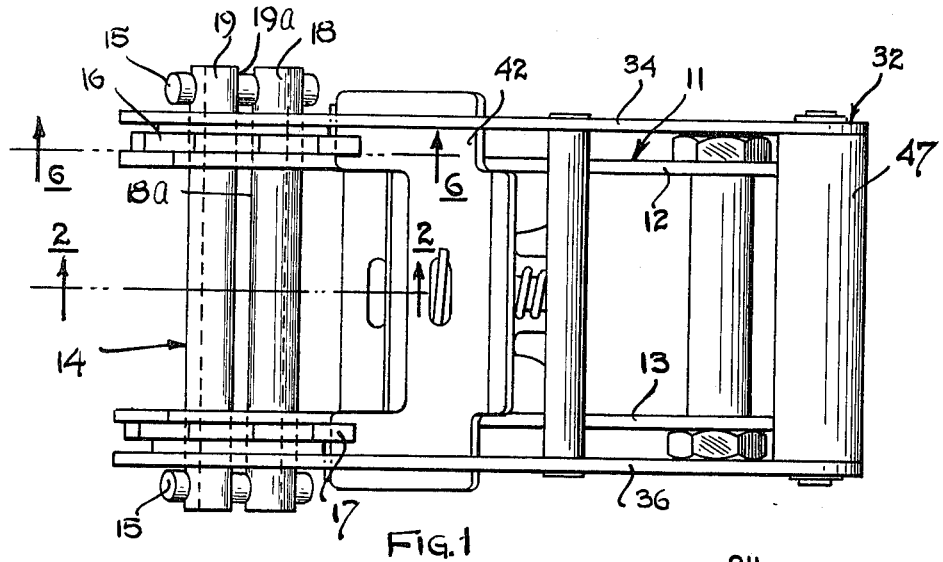
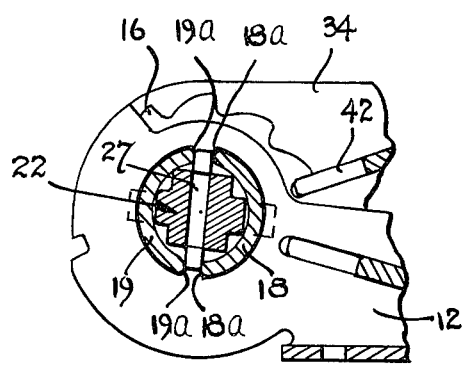
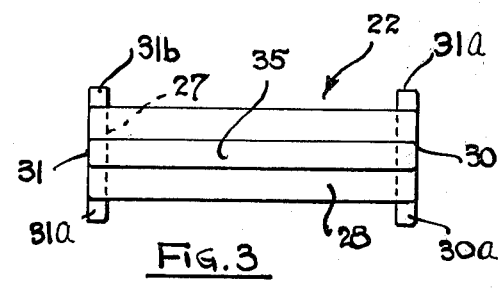
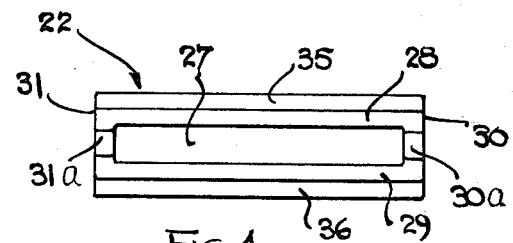
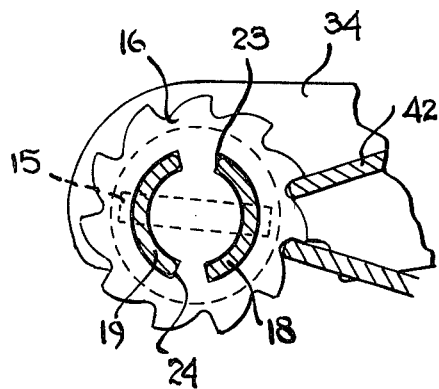
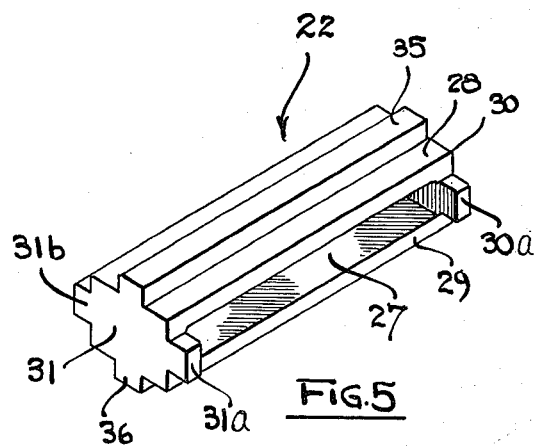

RATCHET BUCKLE HAVING REINFORCING SPREADER BAR INSERT

This invention relates to ratchet buckles for tightening and tensioning strap, and more particularly to a reinforcement insert for strengthening the reel of such a ratchet buckle.

A ratchet buckle is described in U.S. Pat. No. 4,185,360, issued Jan. 29, 1980, and assigned to Ancra Corporation, the assignee of the present application, which describes a ratchet buckle for tightening and tensioning straps which includes a bifucated frame member having a pair of oppositely positioned arms between which a reel member and ratchet wheels are rotatably mounted. The reel member of this ratchet buckle is formed from a pair of oppositely positioned solid bars which are held together near their opposite ends by means of pin members. In the interests of economy, it is possible to use curved plates in forming the reel rather than solid bar members. However, this results in a sacrifice of load handling capability.

The present invention provides simple and economical means for reinforcing such curved plate reels to substantially increase their load handling capability so as to obviate the need for employing solid bars for the reel with its attendant higher cost.

This end result is achieved in the present invention by providing a spreader bar insert member which has an elongated slot formed therethrough with a pair of wing members extending normally to the longitudinal axis of the slot at each of the opposite ends thereof and longitudinal ridges formed along the opposite outer surfaces of the longitudinal walls of this slot, these ridges running substantially parallel to the longitudinal axis of the slot. The insert member is installed between the curved plates with the wings thereof extending between the opposite edges of the plates and with the slot thereof being opposite the spaces between the opposing edges of the reel plates so that a strap to be tensioned can be reeved therethrough.

It is therefore an object of this invention to substantially increase the load handling capabilities of a ratchet buckle without significantly increasing the cost thereof.

It is a further object of this invention to provide means for modifying the reels of existing ratchet buckles to increase the load handling capabilities thereof in a relatively simple and economical way.

Other objects of this invention will become apparent as the description proceeds in connection with the accompanying drawings of which:

FIG. 1 is a top plan view of a ratchet buckle having a preferred embodiment of the reinforcement means of the invention installed therein;

FIG. 2 is a cross sectional view taken along the plane indicated by 2—2 in FIG. 1;

FIG. 3 is a top plan view of the preferred embodiment of the reinforcement means of the invention;

FIG. 4 is a side elevational view of the preferred embodiment of the reinforcement means of the invention;

FIG. 5 is a perspective view of the preferred embodiment of the reinforcement means of the invention; and FIG. 6 is a cross-sectional view taken along the plane indicated by 6—6 in FIG. 1.

Referring now to the drawings, FIGS. 1 and 2 show the present invention incorporated into a ratchet buckle for tightening and tensioning strap of the type described in U.S. Pat. No. 4,185,360, issued Jan. 29, 1980, and assigned to Ancra Corporation, the assignee of the present application. As the present invention is only concerned with the reinforcement structure of the reel which increases the load handling capabilities of the device, and is otherwise the same ratchet buckle as described in U.S. Pat. No. 4,185,360, which patent is incorporated herein by reference, the details of such ratchet buckle need not be herein described except for the portions relating to the reinforcement means. The buckle includes a frame member 11 having a pair of oppositely positioned arms 12 and 13 between which arms a reel member 14 and ratchet wheels 16 and 17 are rotatably mounted. A lever member 32 has an operating handle 47 and a pair of oppositely positioned arms 34 and 36 which are rotatably mounted on reel 14 and which have a ratchet drive plate 42 which engages the teeth of the ratchet wheels such that when the lever is actuated the reel is rotatably driven.

Reel member 14 is formed from a pair of oppositely positioned curved plates 18 and 19, the opposing edges 18a and 19a of which are spaced apart from each other, by virtue of the ends of the curved plates being fitted through curved slots 23 and 24 formed in ratchet wheels 16 and 17. Plates 18 and 19 are retained to the ratchet wheel and the lever member and frame member by means of pins 15 which are fitted through apertures formed in curved plates 18 and 19.

Spreader bar reinforcement member 22, as best can be seen in FIGS. 3-5, has an elongated slot 27 formed therethrough, this slot being formed by oppositely positioned longitudinal side wall portions 28 and 29 and end wall portions 30 and 31 which run normally to the longitudinal axis of the slot. Extending in directions substantially normal to the outer surfaces of wall portions 28 and 29 and running substantially parallel to the longitudinal axis of slot 27 are a pair of ridge portions 35 and 36 respectively. Extending from each of wall portions 30 and 31 in directions substantially normal to the longitudinal axis of slot 27 are a pair of wings 30a, 30b and 31a and 31b, respectively. As best can be seen in FIGS. 1 and 2, with the reinforcement member 22 in its installed position between curved plates 18 and 19, wings 30a, 30b, and 31a, 31b extend into the spaces between the opposite edges 18a and 19a of the curved plates while the ridges 35 and 36 and the edges of wall portions 28 and 29 abut against the inner walls of the curved plates. With the insert member so installed, slot 27 lines up with the spaces between the edges of the curved plates to permit the reeving of a strap to be tightened therethrough.

In this manner, substantial reinforcement is provided for a pair of curved plates such that the load handling capacity of such plates can be substantially increased. It has been found that a typical operative embodiment of the invention the load handling capacity can be increased from 5000 pounds to 10,000 pounds by adding the insert member of the present invention to reels with curved plates. This enables the utilization of curved plates in lieu of solid bars in situations where high load requirements are dictated, thus effecting a substantial savings in cost. Also, the same ratchet buckle can be adapted for either higher or lower load handling capabilities by placing the reinforcement member of the invention between such plates where higher load requirements are presented and omitting this member in applications having lower load requirements.

While the invention has been described and illustrated in detail, it is to be clearly understood that this is intended by way of illustration and example only and is not to be taken by way of limitation, the spirit and scope of the invention being limited only by the terms of the following claims.

What is claimed is:

1. In a ratchet buckle for tightening and tensioning a strap, said buckle including a frame member having a pair of oppositely positioned arms, a reel member and a pair of ratchet wheels rotatably mounted between said arms; a lever member having a pair of oppositely positioned arms rotatably mounted on said reel member and a ratchet drive plate which engages the ratchet wheels such that when the lever member is actuated, the reel member is rotatably driven; the improvement wherein said reel member comprises a pair of oppositely positioned inwardly curving plates with their opposite edges spaced apart from each other and reinforcement means for reinforcing said plates comprising a spreader bar member having an elongated longitudinal slot formed therethrough, a pair of end wall portions running substantially normal to the longitudinal axis of the slot, and a pair of wing portions extending outwardly from the opposite ends of each of said end wall portions in directions substantially normal to the longitudinal axis of said slot, said spreader bar member being fitted between the oppositely positioned curving plates with the wing portions extending into the spaces between the opposite edges of the plates, the slot in said spreader bar member being aligned with the spaces between the edges of said plates, thereby permitting the strap to be reeved therethrough.

2. The ratchet buckle of claim 1 wherein said slot is formed by a pair of oppositely positioned longitudinal flat side wall portions running substantially parallel to the longitudinal axis of said slot.

3. The ratchet buckle of claim 2 and further including a longitudinal ridge portion extending outwardly from the outer surfaces of each of said longitudinal side wall portions of said spreader bar member, said ridge portions abutting against the inner walls of the plates.

4. The ratchet buckle of claim 3 wherein said ridge portions run substantially parallel to the longitudinal axis of said slot.

5. The ratchet buckle of claims 1 or 2 wherein each of said ratchet wheels has a pair of spaced curved slots formed therein, the end portions of said plates being fitted through said curved slots.

* * * * *